Feb. 27, 1934.  W. SCHROEDER  1,948,802
INDUSTRIAL TRUCK
Filed June 1, 1931  7 Sheets-Sheet 1
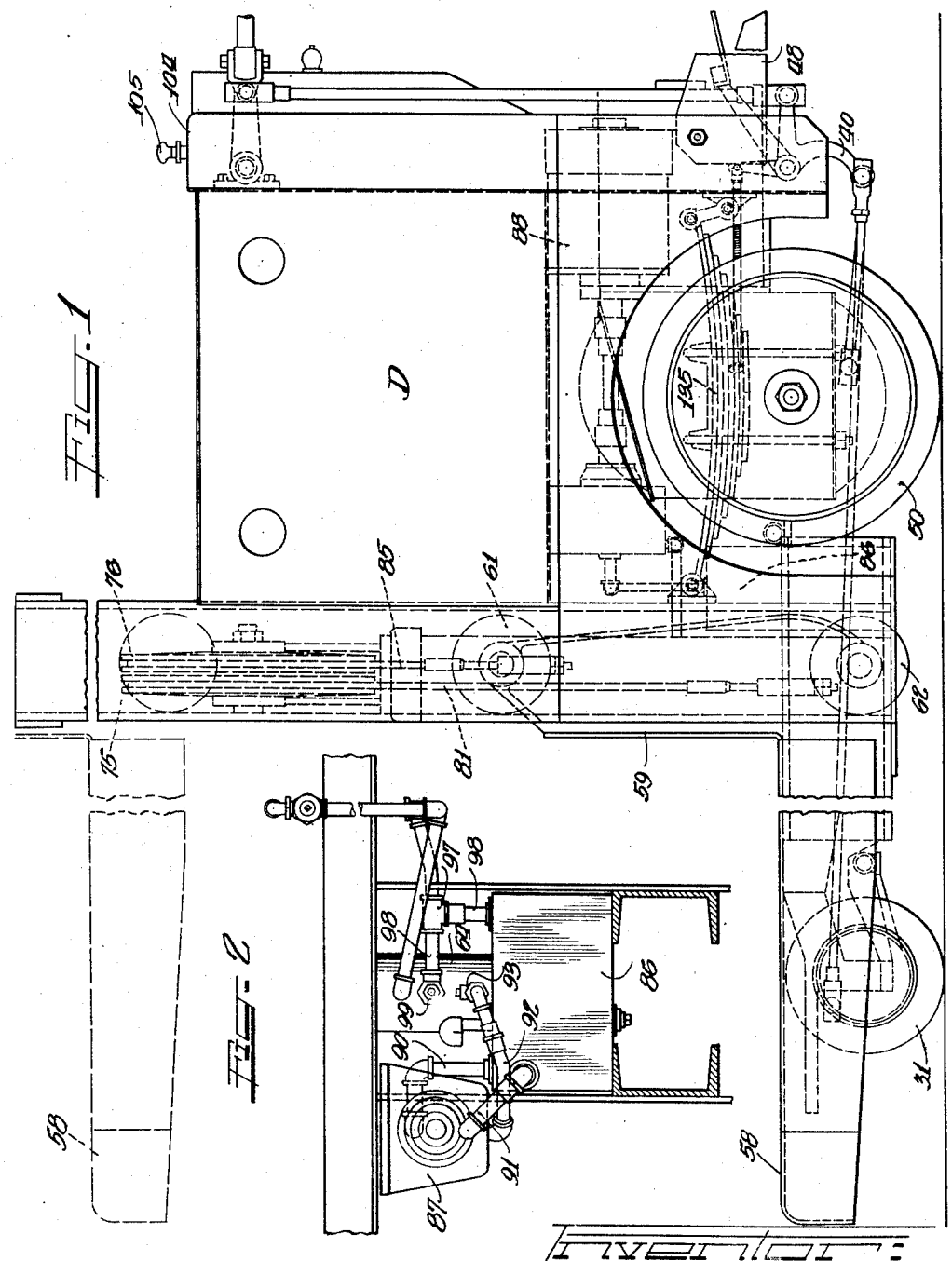

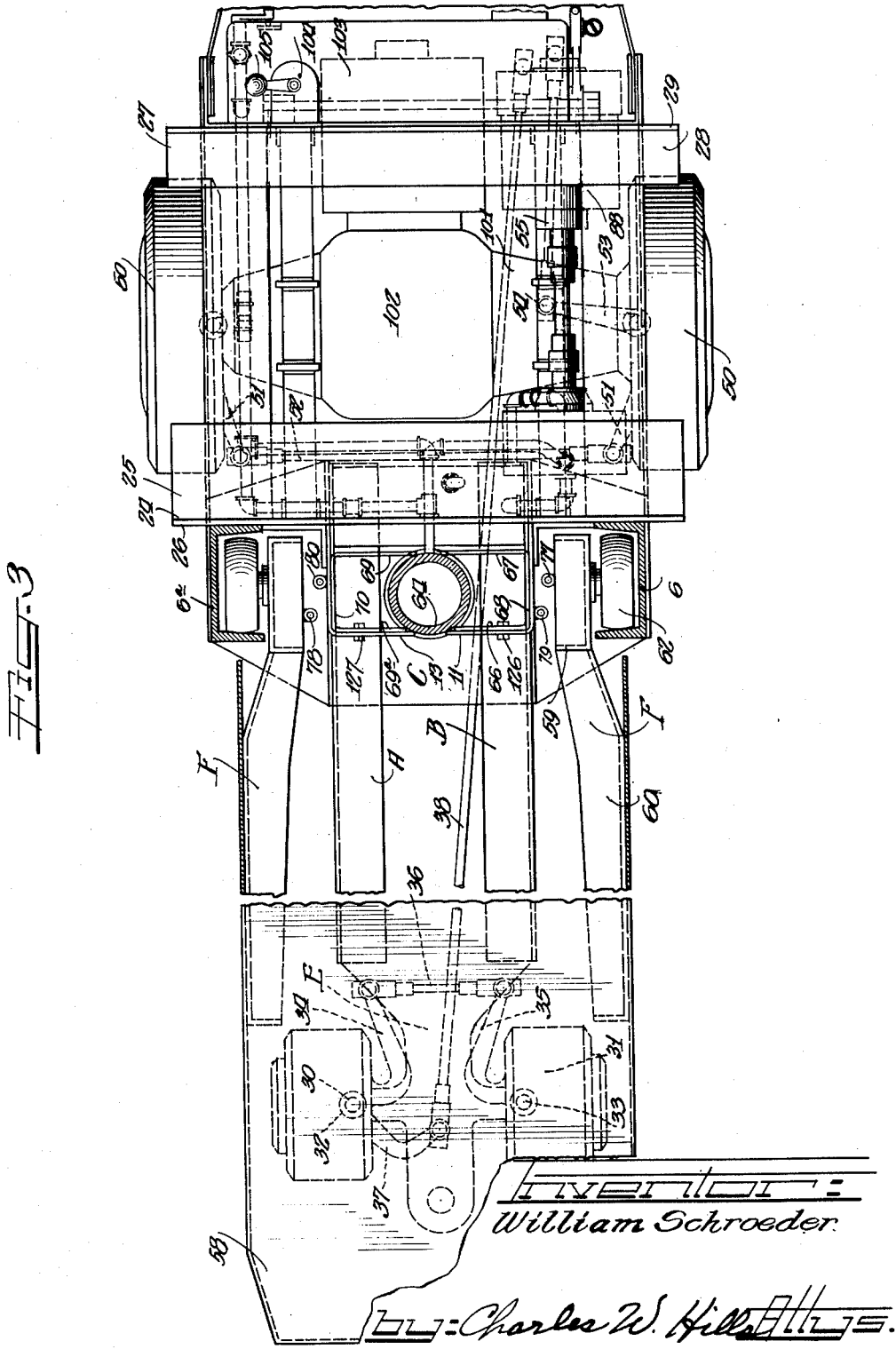

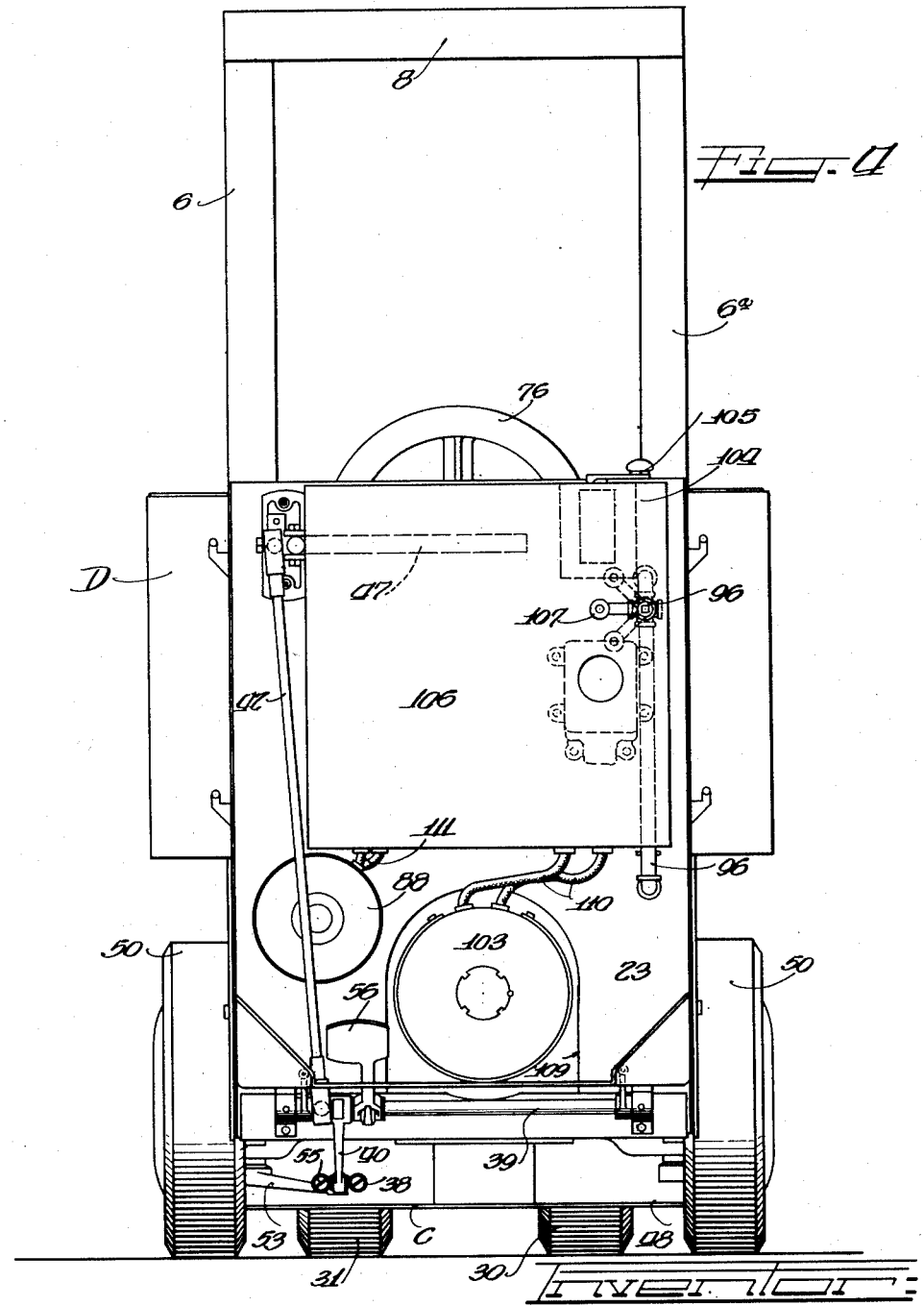

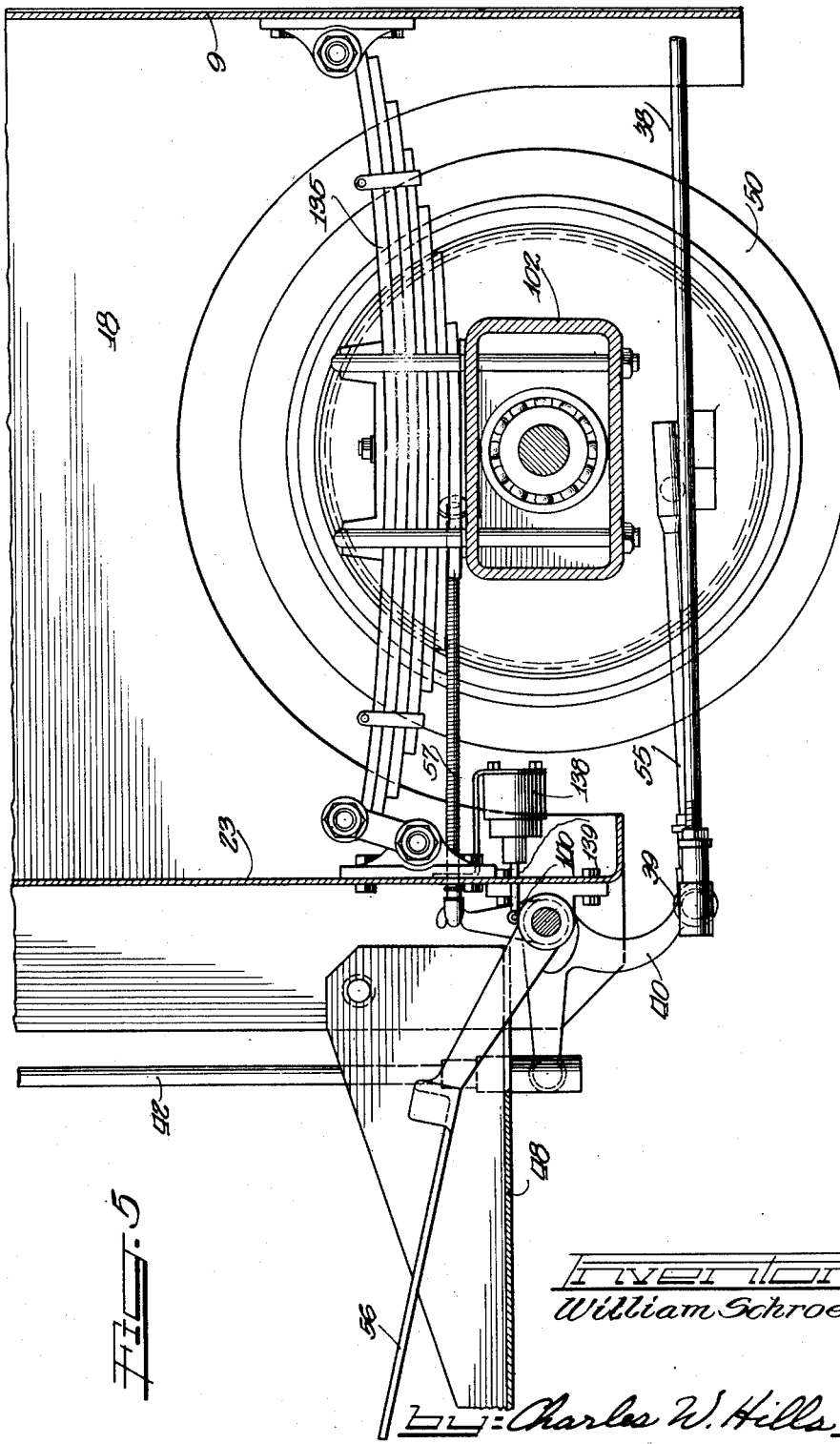

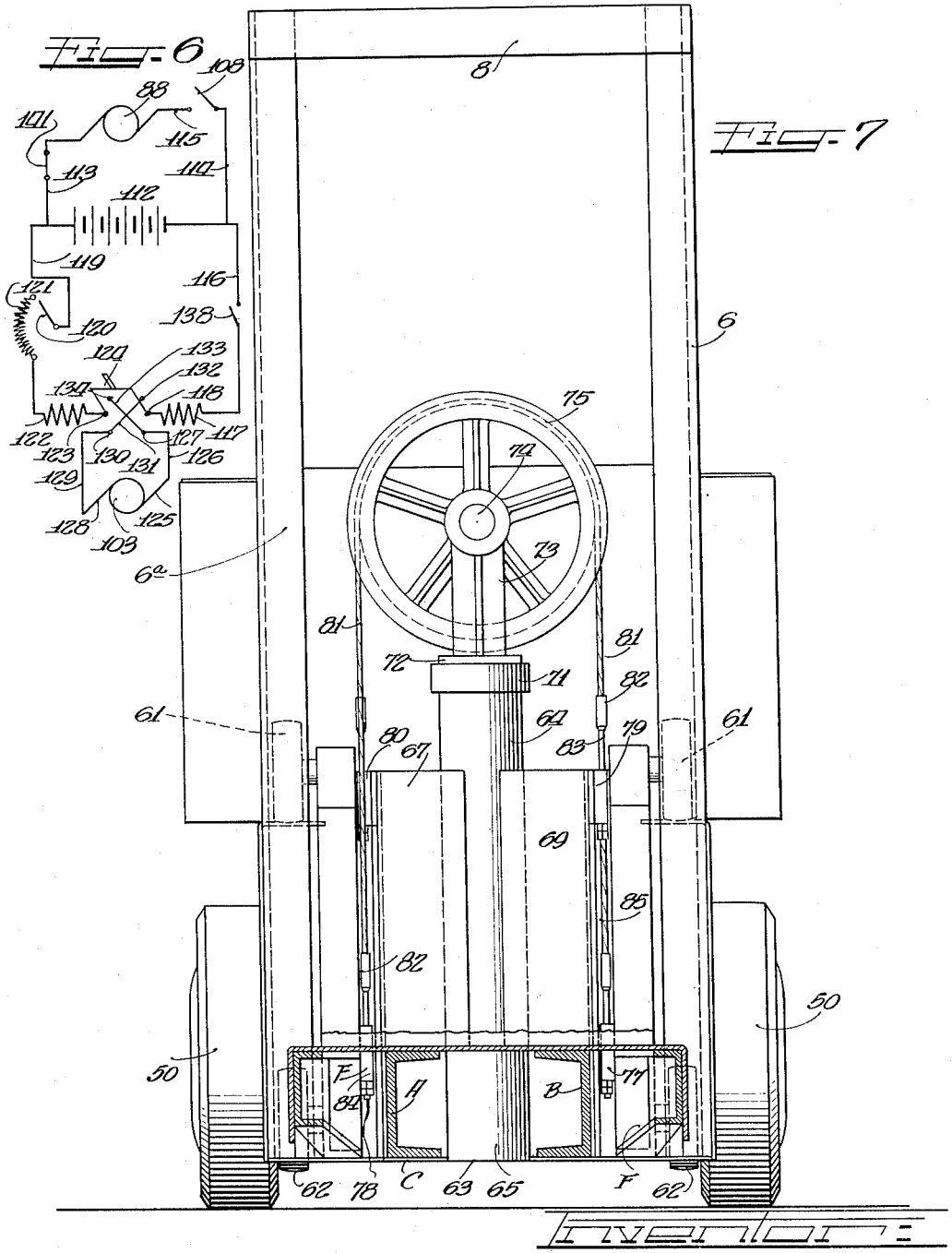

Feb. 27, 1934. W. SCHROEDER 1,948,802
INDUSTRIAL TRUCK
Filed June 1, 1931 7 Sheets-Sheet 6
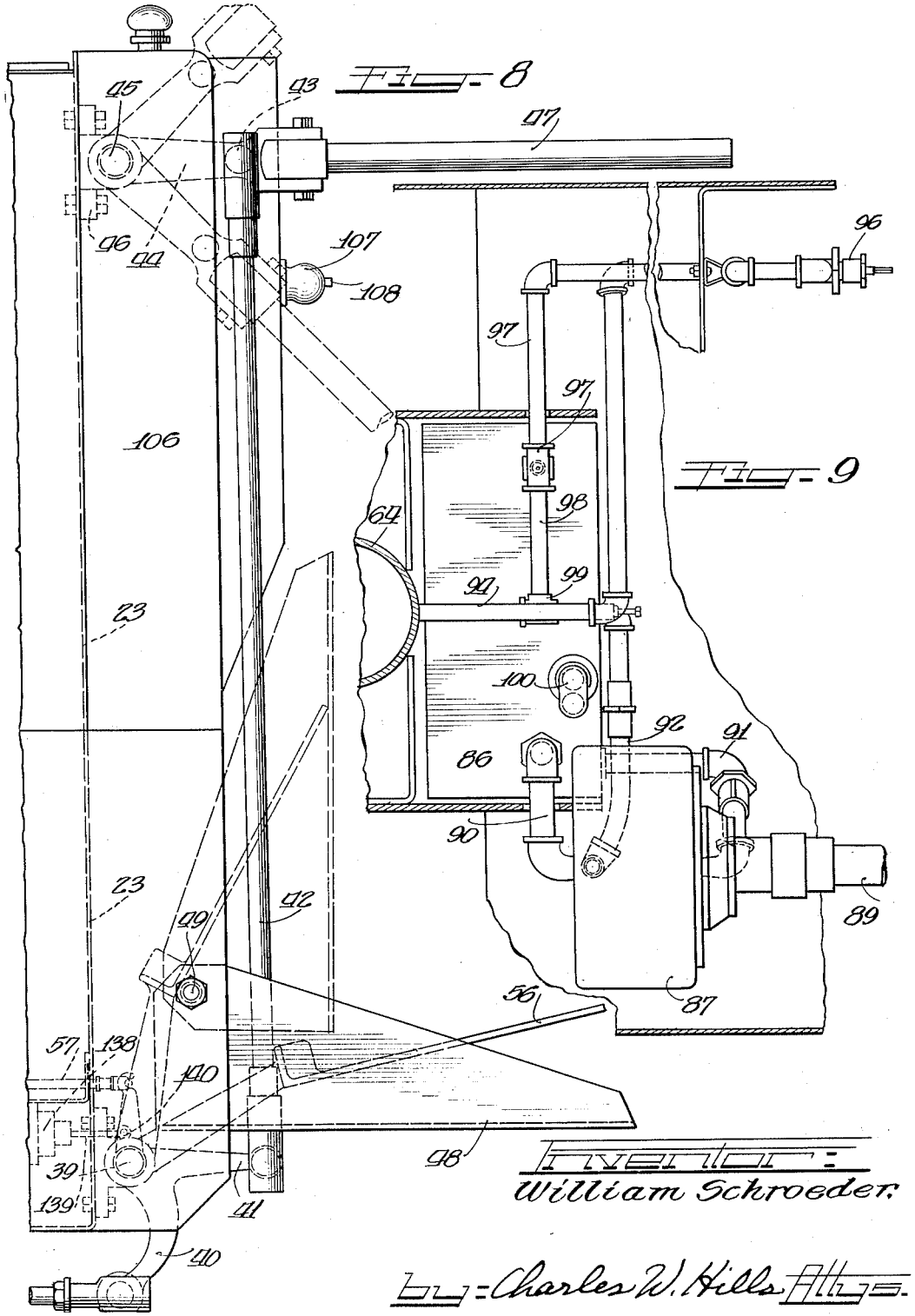
Inventor:
William Schroeder.
by Charles W. Hills Attys Feb. 27, 1934. W. SCHROEDER 1,948,802
INDUSTRIAL TRUCK
Filed June 1, 1931 7 Sheets-Sheet 7
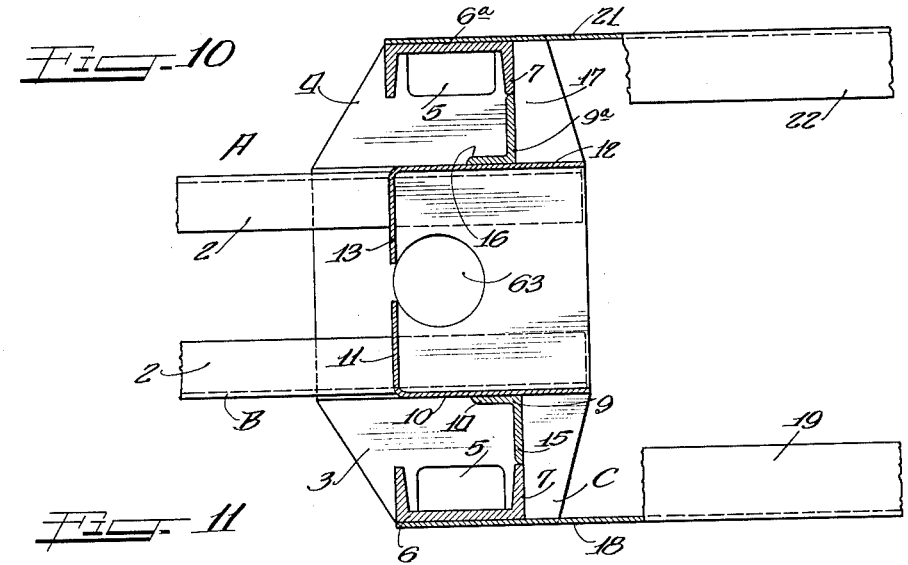
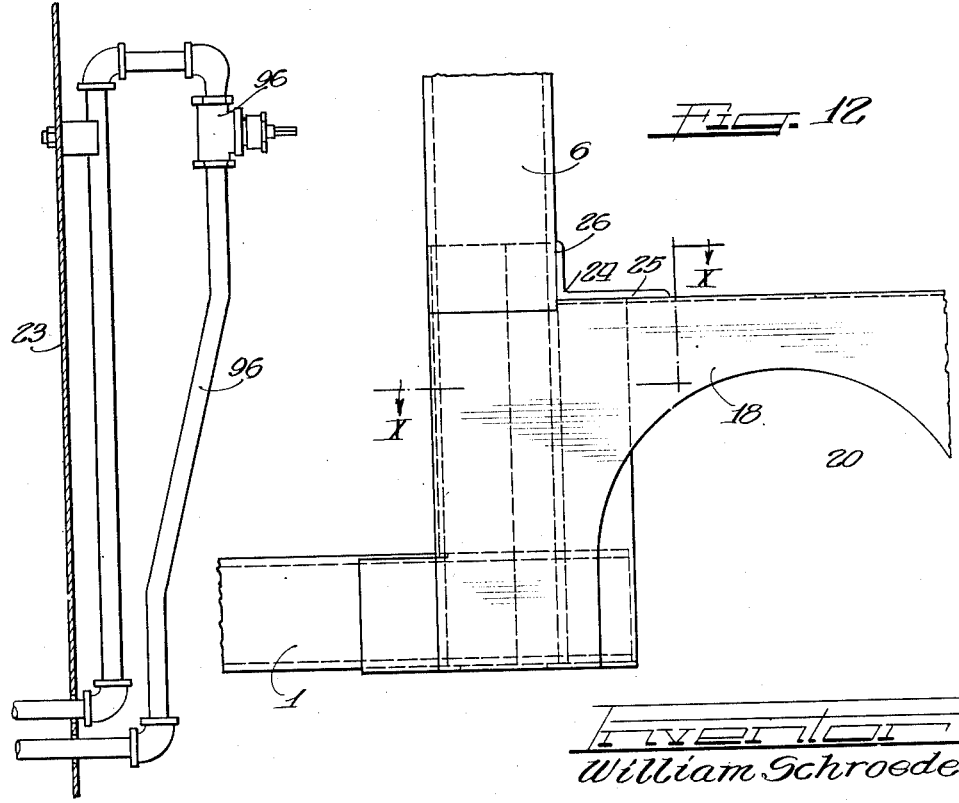
Inventor:
William Schroeder
by Charles W. Hills Attys Patented Feb. 27, 1934

1,948,802

UNITED STATES PATENT OFFICE 1,948,802

INDUSTRIAL TRUCK

William Schroeder, Chicago, Ill., assignor to Mercury Manufacturing Company, Chicago, Ill., a corporation of Illinois Application June 1, 1931. Serial No. 541,309

13 Claims. (Cl. 280—106)

The present invention relates to industrial trucks and is concerned more particularly with features of construction which for the most part find special application to trucks of the elevating platform type but which may also be useful in trucks of other characters.

An object of the present invention is to provide an improved frame for the truck whereby maximum strength may be secured with minimum weight and which may be readily constructed at minimum expense.

Another object of the invention is to provide an industrial truck of the elevating platform type with an improved supporting and guiding structure for the elevating platform whereby maximum elevation for the platform may be secured for a guideway of given height and wherein the platform is at all times maintained against tilting or tipping due to unevenness of the load on the same.

A further object of the invention is to provide supporting carriages for the elevating platform which are strong and rigid and yet which, at the same time, have free running movement in a frame structure.

A still further object of the invention is to provide an industrial truck frame made up of tension and compression members which are welded together throughout, thus providing a strong rigid frame which may be readily assembled and which is of simple construction and which frame may be readily mounted on wheels for use.

The above, other and further objects of the invention will be apparent from the following description, accompanying drawings and appended claims.

Embodiments of the present invention are illustrated in the accompanying drawings and the views thereof are as follows:

Figure 1 is a side elevational view of a truck of the elevating platform type embodying the present invention, showing in full lines the platform in lowermost position and in dotted lines the platform in uppermost position.

Figure 2 is a sectional view showing pipe connections for operating the hoist of the illustrated form of the invention.

Figure 3 is a fragmental top plan view, partially in section, of the truck illustrated in Figure 1.

Figure 4 is a rear view of the truck illustrated in Figure 1 showing the hoisting mechanism in lowermost position.

Figure 5 is an enlarged fragmental view, partially in section, showing the manner of connecting the rear axle to the frame of the present invention.

Figure 6 is a schematic wiring diagram in simplified form showing the control of the hoisting motor and of the driving motor.

Figure 7 is a front elevational view of the truck illustrated in Figure 1 showing parts in section and showing details of construction.

Figure 8 is an enlarged view illustrating the manner of mounting the stand for the operator and also the steering mechanism and a portion of the brake mechanism.

Figure 9 is a fragmental view showing certain details of the pipe circuit for actuating the hoisting mechanism.

Figure 10 is a fragmental plan view, partially in section, of the frame construction of the present invention.

Figure 11 is a side elevational view of a portion of the pipe circuit for controlling the platform hoist.

Figure 12 is a side elevational view of a portion of the frame constructed in accordance with the present invention, the same being a side elevational view of the frame as illustrated in Figure 10.

The drawings will now be explained.

The frame of the present invention includes two main side members A and B which are illustrated as channels and disposed with the webs 1 vertical and the flanges 2 directed inwardly, that is, towards each other so that the webs 1 of the side plate members A and B are outermost. A gusset plate C is welded to the bottom flanges of the main side members A and B and is disposed at the inner ends of these members. The gusset plate C has end portions 3 and 4 extending beyond the adjacent side frame members A and B.

Vertical channels are welded to each end of the gusset plate C. Cut out portions 5 in the gusset plate afford passage way for rollers to be hereinafter described. The channels have the webs 6 thereof disposed outwardly, that is, parallel to the side frame members A and B respectively with the flanges 7 extending inwardly towards each other. The channels just described are spaced from the side frame members A and B and extend upwardly, forming guideways for the cantilever platform. The channels 6 are joined at the top by a member 8 which may be a channel or two angles.

Between each of the channels 6 and the adjacent side frame member is inserted a reinforcing member illustrated herein as an angle 9.

A plate 10 is welded to the web of the side frame member B and is in length equal to the width of the gusset plate C. A portion 11 of the plate 10 is cut at the top of the side frame member B and bent inwardly towards the median axis of the frame. A similar plate 12 is welded to the web of the other side frame A and it likewise is provided with an inturned portion 13. The inturned portions 11 and 13 of the plates 10 and 12 respectively are directed towards each other with the adjacent edges spaced a slight distance. The plates 10 and 12 extend upwardly and terminate below the tops of the upright channels 6.

The angles 9 and 9a are interposed between the plates 10 and 12 respectively and the adjacent channels 6 and 6a. The angle 9 has one leg 14 welded to the adjacent plate 10 and another leg 15 abutting one of the flanges 7 of the adjacent channel upright 6. The abutting edges of the leg 15 of the angle 9 and the flange 7 of the upright 6 are welded all along the joint therebetween while the angle 9 is welded also to the gusset plate C.

The angle 9a has a leg 16 welded against the adjacent plate 12 and another leg 17 abutting one of the flanges 7 of the adjacent upright channel 6. The joint between the leg 17 and the abutting flange 7 of the channel 6 is welded all along the length of such joint thereby making the angle and the adjacent channel integral.

A side plate 18 is welded to the web of the channel 6 and extends in a direction opposite to the side frame members A and B. The height of the plate 18 along the channel 6 is slightly less than the height of the reinforcing member 9 adjacent such upright channel 6. The plate 18 has its top edge turned over forming a horizontal edge 19 which extends rearwardly from the adjacent upright 6 and inwardly from the side plate 18. The plate 18 is illustrated as having a portion cut away at 20 for a rear wheel. A similar side plate 21 is welded to the other upright channel 6a and it in like manner has an inturned leg 22 corresponding to the legs 19 of the side plate 18. Side plate 21 is provided also with a cut out portion for a wheel.

A back plate or dash board 23 is fastened to the rear ends of the plates 18 and 21 being welded to these plates along the joints between the same. The side plates 18 and 21 extend a little distance above the top of the wheels at the rear end of the truck.

An angle 24 is disposed cross-wise of the frame with one leg 25 welded to the inturned ledges 19 and 22 of the side plates 18 and 21 respectively and a vertical leg 26 which is welded to the adjacent flanges 7 of the upright channels 6 and 6a. The reinforcing members 9 terminate substantially even with the top of the legs 26 of the angles 24.

At the rear ends of the side plates 18 and 21 another angle 28 is welded to the inturned ledges 19 and 22 of the side plates (see Figure 3) having one leg 27 extending forwardly towards the angle 24 and the other leg 29 extending vertically. The angle members 24 and 28 in addition to bracing the frame cross-wise serve as supports for the battery box D which is mounted on the truck.

The frame structure just described is made of commercial shapes and plates all of which are welded together forming a unitary integral structure, affording maximum strength with minimum weight.

The frame just described is designed to care for the high stresses created by the cantilever platform. The frame construction eliminates the necessity of diagonal bracing so that the battery compartment may be entirely free of overhead obstruction and at the same time such construction enables movement of the platform rollers in a vertical line. The frame constructed as described is compact and strong, giving the shortest possible overall truck length for a given size of platform.

A casting E is secured to the front end of the side frame members A and B and is inserted between the flanges of these channel members. The casting extends forwardly of the front ends of the side frame members A and B and supports the front wheels 30 and 31. The wheels 30 and 31 are pivoted at 32 and 33 respectively to the casting E for turning movement. The pivotal points 32 and 33 are steering knuckles to which are attached steering arms 34 and 35 respectively, the ends of which are connected by a bar 36 which is adjustable to align the wheels 30 and 31. Another arm 37 is connected to one of the knuckles herein shown as connected to the knuckle 32 to which is attached a steering rod 38 whereby the front wheels may be steered as desired.

A cross-bar 39 is secured near the rear end of the truck and is provided with a bell crank, one arm 40 of which is connected to the steering bar 38 and the other arm 41 of which is connected to a steering bar 42. The steering bar 42 is vertically disposed and is swiveled at 43 near its upper end to an arm 44 which is pivoted at 45 to a bracket 46 secured to the backboard or dash 23. A lever 47 extends rearwardly from the arm 44 and serves as the handle for operating the steering mechanism. The lever 47 is moved up and down so that the bar 42 in turn is moved up and down thus imparting forward and back movement to the reach rod 38 for turning the front wheels as desired.

A platform 48 is pivoted at 49 to a portion of the frame structure and when in horizontal position serves as a platform for the operator of the truck. When not in use it may be swung upwardly in out of the way position as shown in dotted lines in Figure 8.

Rear wheels 50 are carried on stub axles forming part of steering knuckles whereby these wheels may be turned for cooperating with the front wheels to steer the truck around sharp corners and the like. Each of the rear wheels 50 has a steering arm 51 associated with the same, which arms are connected by cross links 52 for maintaining alignment of the rear wheels. Another arm 53 is fastened to the steering knuckle of one of the rear wheels and this in turn is swiveled at 54 to a steering rod connected to a bell crank similar to that to which the rod 38 is connected for steering the rear wheels simultaneously with the front wheels.

A brake pedal 56 is connected to a flexible brake control cable 57 for manipulating the brakes which are, in the present instance, associated with the rear wheels 50.

An elevating platform 58 consisting of plate metal bent over two platform frame members F is raised and lowered on the truck.

Each platform frame member F includes a vertical portion 59 and a horizontal portion 60. The platform is a cantilever platform. The vertical portion 59 of a side frame member carries rollers 61 and 62 with the roller 61 supported near the top of the upright portion 59 and the roller 62 supported near the lower end of said upright portion. The rollers 61 and 62 of the left hand frame member F are guided within the channel 6 while the corresponding rollers on the opposite platform side frame member are guided within the channel member 6a. The flanges of the channel members 6 and 6a are directed inwardly or towards each other so that the rollers for the platform move inwardly of such channel and are thus protected from damage should the truck encounter an obstruction or be in collision or like accident. The enclosure of the rollers also is a valuable safety feature in preventing the clothing of the operator or workmen being caught thereon. The diameters of the rollers 61 and 62 are such as to occupy substantially all of the space between the flanges of the uprights 6 and 6a, thus serving as a steadying influence for the platform in its raising and lowering movements.

The platform 58 when in lowered position rests on top of the side frame members A and B of the truck frame structure.

The gusset plate C is provided centrally thereof with an opening 63.

A hydraulic cylinder 64 is vertically supported on the plates 67 and 69 with its lower end 65 extending through the opening 63 in the gusset plate. The front of the cylinder 64 is welded to the inturned portions 67 and 69 respectively of the plates 68 and 70 of the cylinder structure, being welded thereto along the joints between the same. A U-shaped vertically disposed plate 66 has one portion 67 engaging against the rear portion of the cylinder 64 to which it is welded along the joint, another portion 68 is welded against the inner face of the plate 10 of the frame structure while the leg opposite the leg or portion 67 is welded along its margin to the cylinder 64. A similar plate is secured to the opposite side of the frame structure with one portion 69 engaging against the cylinder 64 and welded thereto along the joint. Another portion 70 of this plate is welded to the plate 12 on the other side of the frame structure while the leg 69a has its margin welded to the cylinder 64. The legs 66 and 69a of the U-shaped plates are bolted at 126 and 127 respectively to the plates 11 and 13 of the welded frame structure. The hydraulic cylinder therefore is rigidly supported in the frame structure in the manner described, being welded and bolted in position. The diameter of the lower end 65 of the cylinder 64 is preferably of such size as to tightly engage the opening 63 in the gusset plate 3.

It will thus be observed that the cylinder 64 is rigidly supported substantially throughout its height and is welded in position and firmly bolted to the frame.

A plunger or piston is movable within the hydraulic cylinder 64 and extends through the upper head 71 of said cylinder. The plunger carries a head 72 which is provided with laterally spaced upstanding ears 73 which ears carry a shaft 74. The parts are so disposed that the shaft 74 is parallel to the longitudinal axis of the truck.

Two sheaves 75 and 76 are carried on the shaft 74 and are freely rotatable on the same. The plane of rotation of the sheaves 75 and 76 is normal to the longitudinal axis of the truck.

An apertured ear 77 is fastened to the platform side frame member F at one side of the platform and a similar ear 78 is fastened to the platform side frame member F on the opposite side.

A similar ear 79 is secured to the truck frame structure on the same side of the longitudinal axis thereof as the ear 77 on the platform side frame member F. Likewise, an ear 80 is secured to the truck frame structure on the other side of the longitudinal axis thereof adjacent the ear 78 of the other platform side frame member F. The ears 77 and 79 lie on one side of the truck axis whereas the ears 78 and 80 lie on the opposite side of the truck axis.

A cable 81 has one end secured to the ear 80 on the truck frame structure and passes over the sheave 76, thence downwardly where its other end is secured to the ear 77 on the platform side frame member F on the opposite side of the truck axis.

A cable 81 has one end fastened to the ear 79 of the truck frame structure and passes upwardly and over the front sheave 75, thence downwardly where its other end is connected to the ear 78 of the platform side frame member F on the opposite side of the truck axis from the ear 79. The ends of the cables are provided with sockets 82 which have bolt-like extensions 83 for entering the apertures in the ears 79 and 78 whereby nuts 84 may be applied to the ends of the bolt portions for properly tensioning the cable.

A similar cable 85 with its ends socketed has one end secured to the ear or lug 80 on the frame structure and its other end secured to the ear 77 of the opposite platform side frame member F. The cable 85 passes over the sheave 76.

It will be observed that the cables 81 and 85 are secured to the truck frame structure on opposite sides of the axis thereof, and with the other ends of said cables attached to the elevating platform on the sides opposite to the points of attachment of the cables to the truck frame structure. In this manner the platform is maintained at all times in level position, and no matter where the load is placed on the same the platform will not tilt or cant as is customary with platforms operated and supported in different manners. The fact that the sheaves 75 and 76 freely rotate on the shaft 74 allows relative rotation should such become necessary to even the hoisting effect of the cables with respect to the platform, a feature which is accomplished by the particular manner of attaching the cables and forming part of the present invention.

The plunger actuating the head 72 is moved upwardly by hydraulic pressure and is lowered by gravity.

A fluid reservoir 86 is carried on the truck frame. A pump 87 is driven by an electric motor 88 with the shaft of the motor connected to the pump by means of a spindle 89.

A pipe 91 between the pump 87 and the reservoir 86 returns fluid from the pump to the reservoir during operation.

The fluid under pressure passes from the pump 87 through a pipe 92 to the cylinder 64. A check valve 93 is interposed in this pipe to prevent return of fluid to the pump.

A pipe 94 leads outwardly from the cylinder 64 and has an upstanding portion in front of the backboard or dashboard 23 with a forwardly extending portion communicating with a control valve 96. The valve 96 is conveniently disposed for manipulation by the operator of the truck while standing on the platform 48. A pipe 97 leads from the control valve 96 backwardly to a T 97. A branch 98 extends from the T 97 and communicates with the interior of the reservoir 86 while another branch 98 extends from the T 97 and communicates with the interior of the cylinder 64. A relief valve 99 is interposed in the extension 98. A vent 100 is applied to the reservoir so that the exterior thereof is open to the atmosphere. The vent has a curved outer end with the usual gauze covering the opening to the vent.

The control valve 96 is manipulated by a suitable handle.

The plunger is moved upwardly by actuation of the pump 87 through the instrumentality of the motor 88. The fluid is pumped from the reservoir 86 into the pump 87, thence to the cylinder 64, some of the fluid passing into the pipe 94 to the control valve 96 which, during the raising movement of the platform, is closed. When the platform has reached the desired height the motor is stopped, thus stopping the pump. The provision of the check valve 93 prevents any fluid within the cylinder passing back to the pump, thus the cylinder is supported in extended position by the fluid thus trapped. Any excess fluid there may be in the pump 87 returns to the reservoir through the pipe 91. When it is desired to lower the platform, the operator opens control valve 96 so that the fluid therein passes through the pipe 96 and T 97 to the reservoir 86. The amount of opening of the valve 96 controls the speed of lowering of the platform.

The truck is provided with a dead axle 101 carrying a differential housing 102 on which is supported a driving motor 103. The truck is propelled through the rear wheels 50 actuated by the driving motor 103 and the suitable gearing within the housing 102.

A controller 104 operated by controller handle 105 is conveniently placed on the face of the backboard or dash 23.

A box 106 encloses the switches incidental to the controller and which form no part of the present invention. The box 106 is fastened to the back board or dash 23. A handle 107 is secured to the control valve 96 for actuating the same. The handle 107 is illustrated as having a pin 108 therein which is employed to close a circuit to the pump motor 88 when it is desired to operate the pump. This circuit can be closed only when the control valve handle 107 is in position to close the valve 96.

The back board 23 is provided with a cut out 109 to receive an end of the driving motor 103. Conductors 110 connect the driving motor 103 with the switch mechanism within the control box 106 while conductors 111 connect the pump motor 88 with the switches within the box 106.

Figure 6 illustrates diagrammatically a simple wiring scheme for actuating the pump motor 88 and the driving motor 103.

A battery 112 is carried in the battery box D. A conductor 113 leads from one side of the battery 112 to one side of the motor 88 while a conductor 14 leads from the other side of the battery to a switch 108. The switch when closed makes contact with the conductor 115 connected to the other side of the motor 88 for actuating the motor.

The driving motor 103 is a reversing motor.

A conductor 116 leads from one side of the battery 112 to one end of field coil 117. The other end of the coil 117 is led to member 118 of a reversing switch. A conductor 119 leads from the other end of the battery 112 to an arm 120 of a rheostat. This arm is actuated by the handle 105 of the controller 104. A resistance 121 is provided for low speed with contact points for engagement by the arm 120 and has an end connected to one end of the field winding 122. The other end of the field winding 122 is connected at 123 to the reversing switch 124.

A brush 125 of the motor 103 is connected by a conductor 126 to contact point 127 of the throw over switch. The other brush 128 is connected by conductor 129 to contact point 130 of the reversing or throw over switch. A conductor 131 joins the contact point 130 with point 132 of the reversing or throw over switch arrangement. Another conductor 133 connects the contact 127 with another contact 134.

When it is desired to operate the motor in one direction the switch 124 is moved into engagement with the contacts 132 and 134 and the swinging arm 120 moved into engagement with the low speed point in the resistance 121. The motor is reversed by moving the switch 124 into engagement with the contacts 127 and 130 which will operate the motor in the reverse direction.

The schematic arrangement shown in Figure 6 is illustrative only of the arrangement of switches, wiring and the like within the control box 106.

The rear end of the truck is carried on springs 135 which are connected to the dead axle 101. The driving motor, as before stated, is carried by and is connected to the differential housing 102 of the dead axle. The brakes are normally applied in braking position when the brake pedal 56 is in the up position as illustrated in Figures 1 and 8, that is, when the operator does not have his foot on the pedal. It is necessary to depress the pedal to release the brakes, so that at all times except when the pedal 56 is depressed the brakes are applied to hold the truck from movement.

All of the wheels are disc wheels with hubs that do not project outwardly of the disc, thus are free of interference of anything along the path of movement of the truck.

The brake is normally set, so that the pedal 56 has to be depressed to release the brakes for operation of the truck. A motor and brake interlock is provided so that the motor will automatically be cut out of circuit when pedal is released, thus stopping the truck if the operator should fall off the platform.

A switch 138 is disposed near the pedal 56. A rod 139 connected to the pedal at 140 actuates the switch to close same when pedal is depressed, the switch remaining closed as long as the brakes are released by pedal depression.

The arrangement of the hoist mechanism of the present invention results in an upward movement of the platform which is faster than the upward movement of the plunger of the hoisting cylinder. This is because of the novel arrangement of the sheaves and the cables in the manner described. In like manner, the platform will descend faster than the plunger and plunger head.

A normally closed limit switch 141 is interposed in the circuit of the elevating motor 88 and is opened by the platform when the same reaches its limit of upward movement.

The invention is claimed as follows:

1. An industrial truck having a frame, the frame having two longitudinally extending channels laterally spaced, a gusset plate welded to the rear ends of said channels against the bottom portion thereof and extending beyond the sides of said channels, vertical channels welded to said plate and extending upwardly therefrom outside of and spaced from said first mentioned channels, plates welded to the outsides of said first mentioned channels and extending upwardly from said gusset plate, a portion of each plate being bent inwardly above the first mentioned channels, each of said latter portions being directed toward the other, vertical angles rising from the gusset plate between said last mentioned plates and said second mentioned channels, one leg of one of said angles being welded to its adjacent plate and the other leg of the angle being welded to its adjacent one of the second mentioned channels, a side plate welded to the outside of a second channel and extending therefrom in opposite direction to the first channels, a back plate or dashboard welded to the ends of the side plates, front wheels connected to the first mentioned channels, and rear wheels connected to said back plate and to said angles.

2. An industrial truck frame including two main side frame members, a gusset plate connected to said side frame members, uprights fastened to said gusset plate, side plates fastened to said uprights and extending in a direction opposite to said side frame members, and a back plate connected to the side plates, a pair of wheels connected to the side frame members, and another pair of wheels connected to said frame rearwardly of said side frame members.

3. A truck frame for industrial trucks of the elevating platform type including in combination, two main side frame members with deep channels disposed with the webs vertical and the flanges extending towards each other, a gusset plate at the rear ends of said side frame members and welded to the bottom flanges thereof, uprights for an elevating platform welded to said gusset plate at each end thereof and outwardly of said side frame members, two reinforcing members for said uprights, a reinforcing member extending upwardly between a side frame member and the adjacent upright and being welded to each, side plates welded to the webs of the uprights and extending therefrom in a direction opposite to said main side members, and a back plate or dashboard welded to the said side plates at the ends thereof remote from said uprights.

4. A truck frame for industrial trucks of the elevating platform type including in combination, two main side frame members with deep channels disposed with the webs vertical and the flanges extending towards each other, a gusset plate at the rear ends of said side frame members and welded to the bottom flanges thereof, uprights for an elevating platform welded to said gusset plate at each end thereof and outwardly of said side frame members, two reinforcing members for said uprights, a reinforcing member extending upwardly between a side frame member and the adjacent upright and being welded to each, side plates welded to the webs of the uprights and extending therefrom in a direction opposite to the said main side members, a back plate or dashboard welded to the said side plates at the ends thereof remote from said uprights, a pair of front wheels secured to the front ends of said main side members, and rear wheels connected to members which are joined to the back plate and to the reinforcing members.

5. A truck frame for industrial trucks of the elevating platform type including in combination, two main side frame members with deep channels disposed with the webs vertical and the flanges extending towards each other, a gusset plate at the rear ends of said side frame members and welded to the bottom flanges thereof, uprights for an elevating platform welded to said gusset plate at each end thereof and outwardly of said side frame members, two reinforcing members for said uprights, a reinforcing member extending upwardly between a side frame member and the adjacent upright and being welded to each, side plates welded to the webs of the uprights and extending therefrom in a direction opposite to said main side members, a back plate or dashboard welded to the said side plates at the ends thereof remote from said uprights, a pair of front wheels secured to the front ends of said main side members, and rear wheels connected to members which are joined to the back plate and to the reinforcing members.

6. A truck frame of the class described, including in combination, main side frame members, a gusset plate welded to the undersides of said main frame members, and uprights for an elevating platform welded to said gusset plate outwardly of and spaced from said side frame members.

7. An industrial truck frame of the elevating platform type, including in combination, two metal side frame members, a gusset plate welded to the bottoms of said members, uprights for a movable platform welded to said gusset plate in spaced relation with respect to said side frame members, and a reinforcing member welded to said uprights above said side frame members and cooperating with said gusset plate to rigidify said uprights.

8. An industrial truck frame including in combination, metal side frame members, a gusset plate welded to the bottoms of said members, uprights for a movable platform welded to said gusset plate in spaced relation with respect to said side frame members, side plates welded to said uprights, and a reinforcing member welded to said uprights and said side plates and cooperating with said gusset plate to rigidify said uprights.

9. A truck frame of the class described, including in combination, main side frame members, a gusset plate welded to said members, uprights for an elevating platform welded to said gusset plate in spaced relation to said members, reinforcing members between said side frame members and said uprights and welded to each, and a transverse reinforcing member welded to said uprights and said reinforcing members above said side frame members for rigidifying said uprights.

10. An industrial truck frame of the elevating platform type, including in combination, main frame members, a gusset plate welded to the bottoms of said members, uprights for an elevating platform welded to said gusset plate, plates welded to said members and extending above the same, and reinforcing members for said uprights interposed between said uprights and said plates and welded to each.

11. An industrial truck frame of the elevating platform type, including in combination, main frame members, a gusset plate welded to the bottoms of said members, uprights for an elevating platform welded to said gusset plate, side plates welded to said uprights and extending above the main frame members, reinforcing members for said uprights interposed between said uprights and said main frame members and welded to each, and a transverse reinforcing member welded to said uprights and said side plates for rigidifying said frame.

12. An industrial truck frame of the elevating platform type; including in combination; main frame members; a gusset plate welded to said members; uprights for an elevating platform welded to said gusset plate; plates welded to said members and extending above the same; and reinforcing members for said uprights interposed between said uprights and said frame and welded to each; side plates welded to said uprights; and a reinforcing member welded to said side plates, said uprights, and said reinforcing members for rigidifying said frame.

13. A truck frame of the class described, including in combination, main side frame members, a gusset plate welded to said main members, uprights for an elevating platform welded to said gusset plate, and a cross member welded to said uprights and to certain parts of the frame for rigidifying the uprights.

WILLIAM SCHROEDER.